United States Patent [19]

Holcombe, Jr. et al.

[11] Patent Number: 5,055,137
[45] Date of Patent: Oct. 8, 1991

[54] WATER-INSOLUBLE HIGH TEMPERATURE INK

[75] Inventors: Cressie E. Holcombe, Jr., Farragut; Lloyd R. Chapman, Knoxville, both of Tenn.

[73] Assignee: ZYP Coatings, Inc., Oak Ridge, Tenn.

[21] Appl. No.: 448,510

[22] Filed: Dec. 11, 1989

[51] Int. Cl.$^5$ .................. C04B 12/04; C09D 1/02; C09D 11/00
[52] U.S. Cl. .................. 106/600; 106/286.2; 106/286.7; 106/287.34; 106/23; 106/618; 106/632
[58] Field of Search ............ 106/286.2, 286.7, 287.34, 106/23, 600, 618, 632

[56] References Cited

U.S. PATENT DOCUMENTS

| | | | |
|---|---|---|---|
| 3,102,038 | 8/1963 | Fisher | 106/600 |
| 3,130,061 | 4/1964 | McMahon et al. | 106/287.34 |
| 3,522,066 | 7/1970 | Forsyth | 106/600 |
| 3,533,816 | 10/1970 | Oken | 106/600 |
| 4,741,775 | 5/1988 | Holcombe, Jr. et al. | 106/287.34 |
| 4,810,300 | 3/1989 | Holcombe, Jr. et al. | 106/287.34 |

*Primary Examiner*—William R. Dixon, Jr.
*Assistant Examiner*—Helene Klemanski
*Attorney, Agent, or Firm*—Pitts & Brittian

[57] ABSTRACT

A composition to produce an adherent and water insoluble deposit on substrate surfaces. A coating material for these surfaces is described which can be applied at any temperature up to at least 2000 degrees F., with the resultant deposit being highly adherent and water insoluble after short drying times. This coating has a liquid phase formed from at least water, a pre-reacted lithium silicate, and a pre-reacted potassium silicate. It can also contain a sodium silicate. This coating can be expressed as being about 69 to about 79 wt. % water and about 21 to about 31 wt. % a mixture of $R_2O$ and $SiO_2$. The $R_2O$ is selected from either a mixture of $Li_2O$ and $K_2O$ or from a mixture of $Li_2O$, $K_2O$ and $Na_2O$. The $R_2O$ and $SiO_2$ typically have a molar ratio of about 0.24 to about 0.29, and the $K_2O$ is about 35 to 85% of the total molar amount of the $R_2O$. When $Na_2O$ is present, it is up to about 10% of the total molar amount of the $R_2O$. To this liquid phase is added a suitable pigment or other refractory material, at about 6–80 wt. % based upon the liquid phase. A range of compositions is discussed as well as typical results.

16 Claims, No Drawings

WATER-INSOLUBLE HIGH TEMPERATURE INK

DESCRIPTION

1. Field of Invention

This invention relates to ink-type marking fluids, and more particularly to ink compositions (and binders therefor) for applying markings, such as bar codes and the like, to substrates such as metals. The specific binders and inks have improved resistance to solubility in water, and have high adherence from ambient temperatures to elevated temperatures. The inks are of particular use in the marking of metal ingots, sheets and the like in the metallurgical industry.

2. Background Art

In the metallurgical art, for example, it is a common practice to mark particular pieces of metal ingots, sheets and the like, with a designation or code to identify the composition, heat treatment, customer, etc. Also, portions of these objects are often marked in certain areas or sections to identify later cutting, heat treatment and other metallurgical operations. This marking often takes the form of thin lines or a bar code as applied by a computer-controlled jet printer. Such lines or codes are applied to both cold and hot metal substrates, with cleaned surfaces and oxidized surfaces, and a variety of other surface conditions. Subsequently, these lines or codes are typically read with a scanner. Frequently, this marking is carried out while the substrate is at quite elevated temperatures (about 2000 degrees F.). White pigmented inks are generally used for steels, and dark inks are used for aluminum and other shiny metals. Of course, similar inks are used for substrates other than metal.

Inks currently used in the art often contain organic solvents and additives. In addition to the production of volatiles of potential hazard, such solvents or additives char at elevated temperatures and thereby contribute to a reduction in readability of the applied code. Furthermore, many of the prior commercial inks have some solubility in water, and storage of marked metals in open yards where such are subjected to rain/snow leads to poor readability of the codes after relatively short storage.

Still another problem experienced in the art is the failure of inks that can be applied at high temperature when used near room temperature, and vice versa. Thus, two separate types of inks have generally been used: one for hot applications and one for cold applications. Yet another problem with inks of the prior art is the settling out of pigments and other solid constituents giving rise to problems in the jets of the printers. Also, some of the constituents of the high-temperature inks are not compatible with those of the low-temperature inks thereby necessitating care in cleaning the printer system before changing types of inks.

An improved type of ink and a binder for formulating that ink were developed by the applicants of the present invention. These are reported in U.S. Pat. No. 4,741,775 ('775) issued May 3, 1988, and U.S. Pat. No. 4,810,300 ('300) issued on Mar. 7, 1989, respectively. The second of these patents was based upon a Continuation-in-Part application relative to the earlier of the patents. The technology of these patents is incorporated herein by reference. Prior work in the field of marking inks is detailed in those patents.

Another reference not previously cited is U.S. Pat. No. 3,522,066 issued to M. W. Forsyth on July 28, 1970. This patent describes a process for preparing aqueous lithium silicate-sodium and/or potassium silicate mixtures by admixing an aqueous solution of sodium and/or potassium silicate with an acid-washed silica hydrogel and lithium hydroxide, and then agitating the mixture.

Inks prepared according to the teaching of the '775 and '300 patents demonstrate suitable performance for most applications. However, the solubility in water is relatively high unless the ink has been completely dried before contact with water. There are applications where the marked substrate must be subjected to a damp environment in relatively short times following the application of the ink, e.g., 2 to 4 hours. Due to the drying time of the inks, some are not sufficiently dry at this short time span to resist some water solubility. Thus, there was a need for an ink that had the capability of being applied to both cold and hot surfaces, both clean or oxidized, but with reduced water solubility after short-term drying.

A further problem encountered in the marking of metals, as in a metal processing plant, is that related to loss of marking due to scuffing of the surface. This occurs due to walking on the marked product, movement of other pieces of product across the surface, etc. Therefore, there was a need to provide an ink that had a significant resistance to scuffing after drying.

Accordingly, it is an object of the present invention to provide a binder material for use with marking inks, and the like, that is substantially water insoluble after short drying times.

An additional object of the present invention is to provide a binder for marking inks, and the like, that is water insoluble and scuff resistant after drying times of less than about four hours.

It is another object of the present invention to provide a binder material for use with marking inks, and the like, that will adhere to various substrate materials at either cool or hot temperatures and will not emit adverse volatile materials.

Another object of the present invention is to provide a binder material for use with marking inks, and the like, that will not be damaged upon subsequent heating after application.

A further object of the present invention is to provide a marking ink for use to affix a code to metal components to identify alloy composition, heat treatment, customer, areas for later processing, etc., with the ink suitable for application at temperatures ranging from room temperature to about 2000 degrees F., and resist solubility in water and scuffing within short time periods after application to the substrate.

These and other objects of the present invention will become apparent upon a consideration of the detailed description that follows.

DISCLOSURE OF THE INVENTION

In accordance with the present invention, a binder material is provided for use with marking inks (and the like) having good adhesion characteristics that can be applied to substrates that are either cold or hot, clean or corroded, that has improved resistance to solubility in water after relatively short drying times, e.g., no greater than about four hours. Further, an ink having these same characteristics is provided by adding a coloring material, such as titanium dioxide. This binder, and the ink that results, is substantially unaffected by subsequent heating to elevated temperatures. Specifically, the binder composition has about 69 to about 79 wt. % water and is about 21 to about 31 wt. % $R_2O$ and $SiO_2$, where $R_2O$ is selected from a mixture of $Li_2O$ and $K_2O$ and a mixture of $Li_2O$, $K_2O$ and $Na_2O$. The $R_2O$ and $SiO_2$ have a molar ratio of about 0.24 to about 0.29. The $K_2O$ is about 35% to about 85% of the $R_2O$, and the $Na_2O$, when present, is up to about 10% the total molar amount of the $R_2O$. Typically, titanium dioxide (15–20 wt. %) is added to the binder to form a suitable ink. Other pigments, e.g. $Fe_2O_3$ and $MnO_2$ can be added as well as suspension and filler additives.

BEST MODE FOR CARRYING OUT THE INVENTION

In view of the suitability of the ink of the '775 patent when allowed to completely dry (as after curing at about 400 degrees F.), various modifications were attempted to improve the water insolubility after a 8–12 hour soak. Also, since the inks had a tendency to be easily scuffed, a increased resistance to the scuffing was also desired. For these tests, the inks (containing 15–20% $TiO_2$) were applied to 4×4×0.25 in. steel coupons. After drying for two to four hours, the inks were compared by immersing one-half of the coupon into water and rubbing hard with the finger after about thirty minutes soaking and again after 8–12 hours soaking. Inks surviving this initial test were then tested once per day for a week. The best of these inks were subjected to shoe scuffing by removing the coupons from the water and hard rubbing with sandy, hard-soled shoes.

Initial testing centered on the use of various additives to the standard ink described in the '775 patent. For example, various silicones, acrylics and other additions were evaluated. The acrylic additions met the water insolubility and scuff tests at room temperature, but peeled off when sprayed upon hot metal (above about 400 degrees F.). The silicones were poorly wetting and thus beaded up on hot metal; however, they did provide improved water resistance.

Potassium silicate additions to the standard ink of the '775 patent gave a slight improvement in the performance of an ink on the coupons. The degree of improvement, however, was considered to be insufficient to solve the problems of water solubility and scuffing.

Individual components of the mixture of the potassium silicate with the standard ink, and combinations thereof, were then tested to determine their characteristics. All used a 20 wt. % pigment level. Lithium silicate solution, alone, does not adhere to metals well and peels off upon drying. Colloidal silica also was shown to be non-adherent after drying. Potassium silicate solution is very slow drying, and only is partially water resistant after drying. It can be dissolved on lengthy soaking.

Various combinations of these three components were tested (with 20 wt. % pigment) on the steel coupons with the exception of the combination of lithium silicate plus potassium silicate: this was not tested since it gelled upon mixing and could not be applied to the coupons. None of the combinations was found to provide the characteristics needed for a suitable ink.

The gelled mixture referred to above (lithium silicate-potassium silicate) was mixed with a minimal amount of water (about 15%) in a blender at very high speed. This caused a breaking of the gel to form a thin liquid. To this thin liquid was added 14–20 wt. % titanium dioxide to form a test ink, which was then tested according to the conditions listed above. It was found that this ink was far superior to any previously produced ink for applications on the metal substrate. The ink was highly resistant to dissolution (or softening) after the water soak, and was also highly resistant to scuffing.

The re-dispersing of the gel by the addition of water and high speed mixing was found to be difficult in larger quantities due to the mixing capabilities of equipment. It was found that the superior binder (and ink) can be produces by first adding the extra water to the lithium silicate solution and mixing the same. During the high speed mixing, the potassium silicate solution is slowly added until the mixture is completely blended. In order to shorten the time for blending the pigment into the binder, the pigment is preferably added to one-half of the binder, and then the other one-half of the binder is added. Of course, all of the pigment can be added at one time if desired.

This improved binder liquid is basic (pH of about 12) as in the '300 patent. Thus, it can be used with various additives and with suspension agents such as highly-beneficiated clay and sodium carboxymethylcellulose as described in that patent. Further, as disclosed in the '300 patent, typical additives useful in the binder and/or ink are graphite, oxides, borides, carbides, sulfides, metals and mixtures thereof.

The source of the lithium silicate useful in the improved binder (and ink) are the same as those discussed in the above-referenced '775 patent. These are Lithsil #4, #6 and "S" from Lithium Corp. of America, or lithium silicate solution obtained from Foote Mineral Co. The Lithsil "S" contains sodium silicate.

The potassium silicate is typically Kasil #6, #33 and #1 as obtained from PQ Corporation. The Kasil #6 is deemed to give somewhat improved adherence as contrasted to those formulated of Kasil #1 and #33. Kasil is also available in powder form so one could create a selected potassium silicate solution. These different materials, while having close compositions, are sufficiently different such that, as shown in the tables below, the compositions of the preferred binders (and inks) are given both in the liquid form and in the dried condition.

The variations of the lithium silicate, potassium silicate, sodium silicate and water in the various binder mixtures useful for marking inks are shown in the following Tables 1–5. The mixtures identified as LK1, LK2, LK3, LK4 and LK5 were formulated using Lithsil #4 and Kasil #6 in water: LK6 was formulated using Lithsil "S" and Kasil #6. Of these, LK1, LK2, LK3 and LK6 gave excellent water insolubility, with the other compositions providing acceptable insolubility. Based upon the phase diagram for the three components, the melting point of the binder system is between 800 and 900 degrees C. (1470 and 1650 degrees F.). The LK3 binder composition has a melting temperature at the top of the range.

TABLE 1

| CONSTITUENTS | Wt. % in Batch of Liquid Phase | | | | |
|---|---|---|---|---|---|
| | LK1[a] | LK2[b] | LK3[c] | LK4[d] | LK5[e] |
| Lithsil #4 | 50.0 | 43.5 | 39.2 | 58.8 | 19.6 |
| Kasil #6 | 50.0 | 43.5 | 39.2 | 19.6 | 58.8 |
| Water | — | 13.0 | 21.6 | 21.6 | 21.6 |

[a] Forms jelly immediately upon mixing
[b] Low water coating
[c] Standard binder composition
[d] High Lithsil binder
[e] High Kasil binder

TABLE 2

| CONSTITUENTS | Constituency After Drying/Firing | | | | | | | |
|---|---|---|---|---|---|---|---|---|
| | LK1, LK2, LK3 | | LK4 | | LK5 | | LK6* | |
| | Wt. % | Mol % | Wt. % | Mol % | Wt. % | Mol % | Wt. % | Mol % |
| $Li_2O$ | 3.6 | 7.6 | 6.2 | 12.2 | 1.6 | 3.5 | 2.9 | 6.1 |
| $K_2O$ | 20.4 | 13.5 | 11.7 | 7.8 | 27.0 | 18.7 | 20.5 | 13.7 |
| $SiO_2$ | 76.0 | 79.0 | 82.1 | 80.0 | 71.4 | 77.8 | 74.7 | 78.2 |
| $Na_2O$ | — | — | — | — | — | — | 1.9 | 2.0 |

*Lithsil "S" plus Kasil #6: 43.5% each plus 13% water in the liquid mixture

TABLE 3

| Constituency in Liquid Phase Mol Ratio $R_2O/SiO_2$ | | | | | |
|---|---|---|---|---|---|
| LK1 | LK2 | LK3 | LK4 | LK5 | LK6 |
| 0.27 | 0.27 | 0.27 | 0.24 | 0.29 | 0.28 |

TABLE 4

| CONSTITUENT | Constituency in Liquid Phase Fractional Makeup of $R_2O$* | | | | | |
|---|---|---|---|---|---|---|
| | LK1 | LK2 | LK3 | LK4 | LK5 | LK6 |
| $Li_2O$ | 0.36 | 0.36 | 0.36 | 0.63 | 0.16 | 0.28 |
| $K_2O$ | 0.64 | 0.64 | 0.64 | 0.37 | 0.84 | 0.63 |
| $Na_2O$ | — | — | — | — | — | 0.09 |

*Based on Molar constituency

TABLE 5

| CONSTITUENT | Wt. % Constituency in Liquid Phase | | | | | |
|---|---|---|---|---|---|---|
| | LK1 | LK2 | LK3 | LK4 | LK5 | LK6 |
| $Li_2O$ | 1.1 | 1.1 | 0.9 | 1.3 | 0.4 | 0.9 |
| $K_2O$ | 6.3 | 5.5 | 5.0 | 2.5 | 7.4 | 6.3 |
| $SiO_2$ | 23.6 | 20.5 | 18.5 | 17.4 | 19.7 | 23.1 |
| $H_2O$ | 68.9 | 73.0 | 75.6 | 78.8 | 72.5 | 69.1 |
| $Na_2O$ | — | — | — | — | — | 0.6 |
| Sum of $R_2O$ | 7.4 | 6.5 | 5.9 | 3.8 | 7.8 | 7.8 |
| Sum of $R_2O$ Plus $SiO_2$ | 31.0 | 27.0 | 24.4 | 21.2 | 27.5 | 30.9 |

In addition to the previously disclosed inks, a water-insoluble coating (after drying) is useful as a precoat or primer coat for various water-based coatings that otherwise will not adhere to metals. Of course, the coatings provided by the present invention can be applied to solid substrates other than metals. This includes, for example, various ceramics. The present binder composition, like that of the '300 patent, is also useful as a "rigidizer" with fibrous materials, or mixed with fibrous, flaky or other types of fillers.

From the foregoing, it will be recognized by persons versed in the art that a coating (or ink) has been developed that can be used at both room temperature or elevated temperature on various substrates. The resultant deposit has high adherence and good water insolubility. In the applications as a marking ink to identify metal ingots, sheets, etc., the composition is suitable at these extreme temperatures giving rise to markings via jet printers that can be machine or visually read.

Although a limited number of compositions have been identified, a range of compositions has been bracketed. It will be recognized that the invention is not to be limited by these tested compositions, but by the appended claims and their equivalents.

We claim:

1. A composition which comprises about 69 to about 79 wt. % water and about 21 to about 31 wt. % $R_2O$ and $SiO_2$, where $R_2O$ is selected from the group consisting of a mixture of $Li_2O$ and $K_2O$ and a mixture of $Li_2O$, $K_2O$ and $Na_2O$, said $R_2O$ and said $SiO_2$ having a molar ratio of about 0.24 to about 0.29, and said $K_2O$ being about 35 to about 85% of the total molar amount of said $R_2O$.

2. The composition of claim 1 wherein said $R_2O$ is a mixture of $Li_2O$ and $K_2O$.

3. The composition of claim 1 wherein said $R_2O$ is a mixture of $Li_2O$, $K_2O$ and $Na_2O$, said $Na_2O$ being about 0.6 up to 10% of the total molar amount of said $R_2O$.

4. The composition of claim 1 further comprising a suspension agent selected from the group consisting of highly beneficiated clays and sodium carboxymethylcellulose, said suspension agent present at about 0.5 to about 5.0 wt. % based upon a combination of said water, said $SiO_2$ and said $R_2O$.

5. The composition of claim 1 further comprising about 6 to about 80 wt. % of a finely divided refractory powder selected from the group consisting of graphite, oxides, borides, nitrides, carbides, sulfides, metals and mixtures thereof, said refractory powder being substantially stable in said $R_2O$ and $SiO_2$.

6. The composition of claim 1 which, when fired, yields a constituency of about 71 to about 83 wt. % $SiO_2$, about 11 to about 27 wt. % $K_2O$, about 1 to about 7 wt. % $Li_2O$ and up to about 2 wt. % $Na_2O$.

7. The composition of claim 1 further comprising a pigment of about 12–60 wt. % based upon said mixture of water, $R_2O$ and $SiO_2$, said pigment selected from the group consisting of oxides and oxide mixtures containing transition metals.

8. The composition of claim 7 wherein said pigment is $TiO_2$ of about 12 to about 20 wt. %.

9. A composition for application over a wide temperature range to a substrate to form an adherent, fast curing, scuff resistant and water insoluble coating when dry, which comprises:

a liquid phase consisting essentially of about 69 to about 79 wt. % water and a mixture of about 21 to about 31 wt. % $R_2O$ and $SiO_2$, where $R_2O$ is selected from the group consisting of a mixture of $Li_2O$ and $K_2O$ and a mixture of $Li_2O$, $K_2O$ and $Na_2O$, said $R_2O$ and said $SiO_2$ having a molar ratio of about 0.24 to about 0.29, and said $K_2O$ being about 35 to about 85% of the total molar amount of said $R_2O$; and an additive of about 6 to about 80 wt. % based upon said liquid phase, said additive being a finely divided refractory material selected from the group consisting of graphite, oxides, borides, nitrides, carbides, sulfides, metals and mixtures thereof, said additive being stable in said liquid phase.

10. The composition of claim 9 further comprising a suspension agent selected from the group consisting of beneficiated clays and sodium carboxymethylcellulose, said suspension agent present at about 0.5 to about 1.5 wt. % based upon said liquid phase.

11. A method of preparing a composition for application over a wide temperature range to a substrate to form an adherent, fast curing, scuff resistant and water insoluble coating when dry, which comprises preparing a liquid phase by mixing together:
  about 13 to about 22 wt. % water;
  about 19 to 59 wt. % of a $Li_2O\text{-}SiO_2$ solution having about 75 to about 80% water and a $SiO_2$:$Li_2O$ molar ratio of about 4.2:1 to about 6.3:1; and
  about 19 to about 59 wt. % of a $K_2O\text{-}SiO_2$ solution having about 61 to about 71% water and a $SiO_2$:$K_2O$ molar ratio of about 3.3:1 to about 3.0:1.

12. The method of claim 11 further comprising mixing with said liquid phase a suspension agent selected from the group consisting of highly beneficiated clays and sodium carboxymethylcellulose, said suspension agent present at about 0.5 to about 5 wt. % based upon said liquid phase.

13. The method of claim 12 further comprising mixing with said liquid phase and said suspension agent about 6 to about 80 wt. % of a finely divided refractory powder selected from the group consisting of graphite, oxides, borides, nitrides, carbides, sulfides, metals and mixtures thereof, said refractory powder being substantially stable in said liquid phase.

14. The method of claim 11 further comprising mixing a pigment into said liquid phase, said pigment present at about 12 to about 60 wt. % based upon said liquid phase, said pigment selected from the group consisting of oxides and oxide mixtures containing transition metals.

15. The method of claim 14 wherein said pigment is $TiO_2$ of about 12 to about 20 wt. %.

16. The method of claim 11 wherein said water is about 21.6, said $Li_2O\text{-}SiO_2$ solution is about 39.2, and said $K_2O\text{-}SiO_2$ solution is about 39.2.

* * * * *